W. KIRKWOOD.
SWINGING PIPE JOINT.
APPLICATION FILED JUNE 5, 1912.
1,069,554.
Patented Aug. 5, 1913.
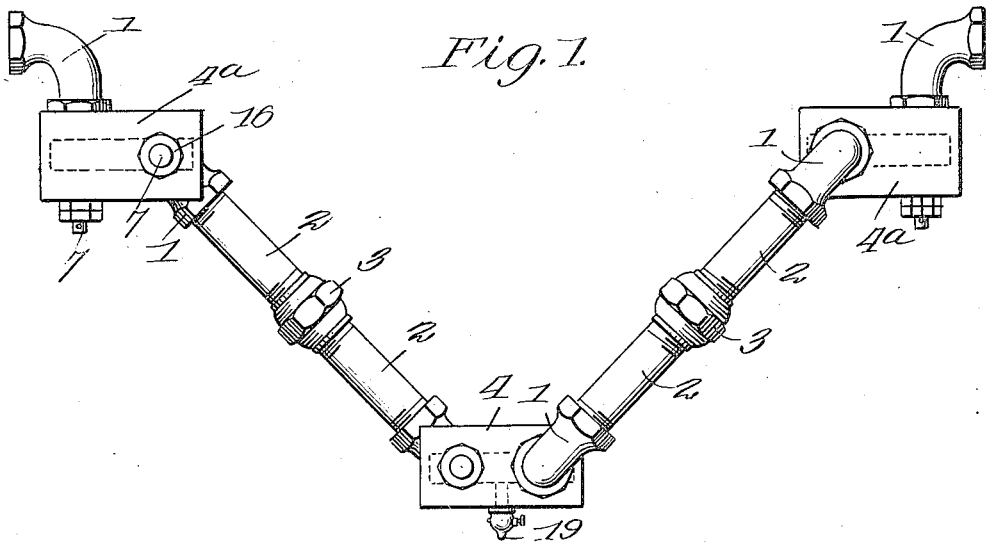
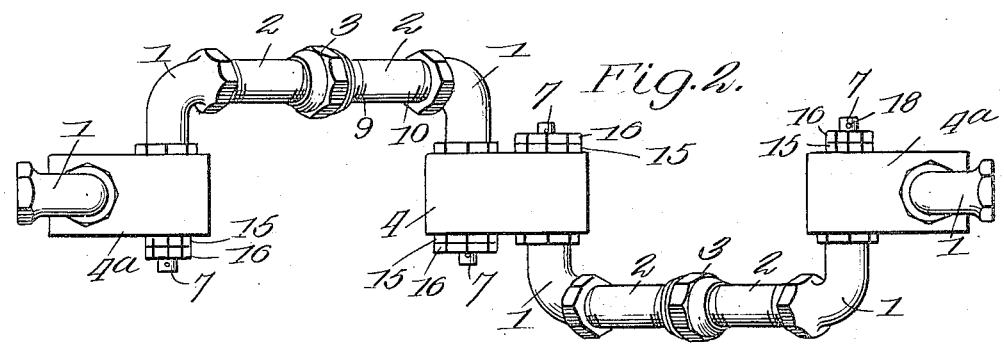
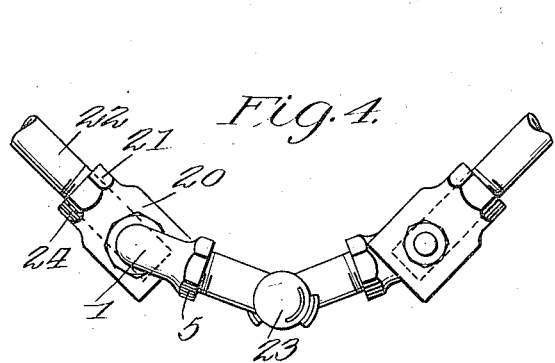
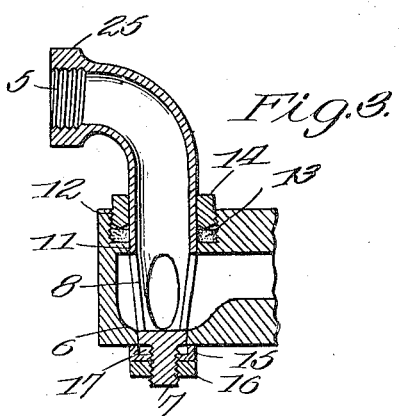
WITNESSES
INVENTOR
WILLIAM KIRKWOOD
BY
ATTORNEYS

UNITED STATES PATENT OFFICE.

WILLIAM KIRKWOOD, OF PITTSBURG, KANSAS.

SWINGING PIPE-JOINT.

1,069,554.

Specification of Letters Patent.

Patented Aug. 5, 1913.

Application filed June 5, 1912. Serial No. 701,791.

*To all whom it may concern:*

Be it known that I, WILLIAM KIRKWOOD, a citizen of Pittsburg, in the county of Crawford and State of Kansas, have invented certain new and useful Improvements in Swinging Pipe-Joints, of which the following is a specification.

My invention is an improvement in swinging pipe joints, and has for its object, the provision of a simple device of the character specified, especially adapted to make a flexible connection between two pipe lines, without the use of hose or connections of fabric material.

In the drawings: Figure 1 is a plan view of the improved joint; Fig. 2 is a side view; Fig. 3 is a detail vertical section of a part of the joint; and, Fig. 4 is a plan view of a modified form.

The present embodiment of the invention comprises a plurality of elbows or goosenecks 1, a plurality of short sections of pipe 2, unions 3, and boxes or casings 4 and 4$^a$, which are connected together in a manner to be described, with packings arranged between. Each of the elbows 1 is provided at one end with an internally threaded portion 5, and at the other with a solid portion 6, having a reduced threaded stem 7, and the solid portion is connected to the elbow by oppositely arranged integral straps or bars 8. Each of the short sections 2 of pipe has its opposite ends 9 and 10 screw threaded, and the unions 3 are of ordinary form, for connecting the sections 2 together. The casings or boxes 4 and 4$^a$ are rectangular in cross section, and each casing is provided with a plurality of transverse openings 11, for permitting the elbows to be connected to the casings. Each of the openings 11, Fig. 3, extends entirely through the casing at one end, and is of a size at one end to fit the elbow, and at the other to fit the solid portion 6. The said portion 6 is frustoconical or tapering and the portion of the opening 11 which it fits is similarly shaped. One end of the opening 11 is counterbored, as shown at 12, and internally threaded, and a packing 13 encircles the pipe in the counterbore. A nut 14 is threaded onto the counterbored portion of the opening, above the packing, to hold it in place, the nut encircling the elbow. The stem 7 extends beyond the opening 11, and two nuts 15 and 16 are threaded onto the stem. The nut 15 is recessed on its inner face, or cup-shaped, as shown at 17, and the nut 16 is a lock nut. Both nuts are of greater diameter than opening 11, and a pin 18 is passed through the stem to hold the nuts in place. The elbows may rotate in the openings 11, but the joint is fluid tight on account of the packing 13, and on account of the nut 15. The boxes or casings 4 have two openings 11, parallel with each other, and at opposite ends of the boxes, while boxes 4$^a$ have two openings at opposite ends, and at right angles to each other.

It will be evident that many variations may be made, by combining the elements in different relations. As for instance in Fig. 1, where two boxes 4$^a$, one box 4, six elbows, four pipes 2, and two unions are combined. This arrangement when connecting the air pipes of two cars, would have one end elbow connected to the pipe of each car. This arrangement has great flexibility, and a bleed valve 19 may be provided at the central box, to facilitate connection and disconnection. In the embodiment shown in Fig. 4, the boxes are dispensed with as are also the unions. In this construction, a small box or casing 20 is used, each box having an internally threaded end opening 21, for engagement by the end of a pipe 22. Each box has also a transverse opening at one end corresponding to opening 11, and the elbows 1 are connected to the boxes in the same manner as shown in Fig. 3.

A short pipe 2 is threaded into the end 5 of each elbow, and the pipes 2 are connected by the ordinary hose pipe coupling 23 of air brake systems. The boxes 20 at end 21 are polygonal to receive a tool for turning the boxes, as shown at 24, and the ends 5 of the elbows are similarly shaped, as shown at 25.

I claim:

A swinging pipe joint, comprising a plurality of hollow members, each having a transverse opening near each end intersecting the hollow portion, an elbow for each opening, each elbow having at one end a solid portion provided with a reduced threaded stem and having openings between the solid portion and the elbow communicating with the hollow portion of the said member, said solid portion being frustoconical and the transverse opening of the hollow member being similarly shaped, nuts threaded on to the stem and engaging the outer face of the member to hold the elbow in place, the opposite end of each opening from the stem being counterbored, a packing in the counterbore, a nut threaded into the counterbore to hold the packing in place, the nut on the stem adjacent to the hollow member being chambered on its inner face, and a connection between the other ends of the elbows.

WILLIAM KIRKWOOD.

Witnesses:
W. M. BOSWORTH,
C. W. BUGBEE.